United States Patent [19]

Kokami et al.

[11] Patent Number: 5,818,179
[45] Date of Patent: *Oct. 6, 1998

[54] BRUSHLESS MOTOR DRIVE CIRCUIT INCLUDING A LINEAR AMPLIFIER FOR SENDING AN OUTPUT SIGNAL BASED UPON THE DETECTED BACK ELECTROMOTIVE FORCE VOLTAGE

[75] Inventors: Yasuhiko Kokami; Satoshi Kondo, both of Takasaki, Japan

[73] Assignee: Hitachi, Ltd., Tokyo, Japan

[*] Notice: The term of this patent shall not extend beyond the expiration date of Pat. No. 5,569,988.

[21] Appl. No.: 685,857

[22] Filed: Jul. 24, 1996

Related U.S. Application Data

[63] Continuation of Ser. No. 271,642, Jul. 7, 1994, Pat. No. 5,569,988.

[30] Foreign Application Priority Data

Jul. 15, 1993  [JP]  Japan ................................. 5-175625
Jul. 15, 1993  [JP]  Japan ................................. 5-175626

[51] Int. Cl.$^6$ ....................................................... H02P 7/00
[52] U.S. Cl. ........................... 318/254; 318/439; 388/910; 388/928.1
[58] Field of Search ................................. 318/138, 254, 318/439; 388/816–822, 928.1, 910

[56] References Cited

U.S. PATENT DOCUMENTS

| | | | |
|---|---|---|---|
| 3,708,737 | 1/1973 | Johnson | 318/636 |
| 4,132,930 | 1/1979 | Schalk | 318/138 |
| 4,295,085 | 10/1981 | Lafuze | 318/721 |
| 4,344,023 | 8/1982 | Yokobori et al. | 318/254 |
| 4,353,016 | 10/1982 | Born | 318/254 |
| 4,390,826 | 6/1983 | Erdman et al. | |
| 4,492,903 | 1/1985 | Knight et al. | |
| 4,494,058 | 1/1985 | Berti | |
| 4,531,167 | 7/1985 | Berger | 360/77 |
| 4,678,973 | 7/1987 | Elliott et al. | |
| 4,743,815 | 5/1988 | Gee et al. | 318/254 |
| 4,835,448 | 5/1989 | Dishner et al. | 318/254 |
| 5,194,786 | 3/1993 | Smith et al. | 318/254 |
| 5,198,733 | 3/1993 | Wright | |
| 5,241,247 | 8/1993 | Salerno et al. | |
| 5,402,053 | 3/1995 | Divan et al. | 318/768 |

OTHER PUBLICATIONS

"Sensorless Drive for Brushless D.C. Motor", Toshiba Review, vol. 45, No. 9, pp. 755–758, published BY Toshiba Corp., 1990 (with English translation).

*Primary Examiner*—David S. Martin
*Attorney, Agent, or Firm*—Fay, Sharpe, Beall, Fagan, Minnich & McKee

[57] ABSTRACT

In a d.c. brushless motor drive circuit, the output amplifier produces a motor winding drive current with dulled rise/fall edges from a detected sinusoidal back e.m.f. voltage induced on the winding during the steady-state operation when the motor runs at the rated speed. The output amplifier includes a set of transistors each brought to a saturated conductive state or a cutoff state in accordance with the phase conduction sequence to connect one end of each motor winding to a ground voltage source, and another transistor operated continuously to connect the neutral point, which is opposite ends of the motor windings connected together, to a power voltage source.

8 Claims, 12 Drawing Sheets

FIG. 4A
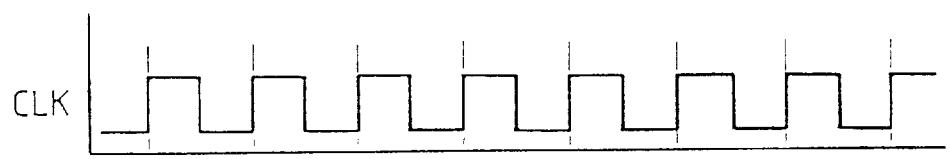
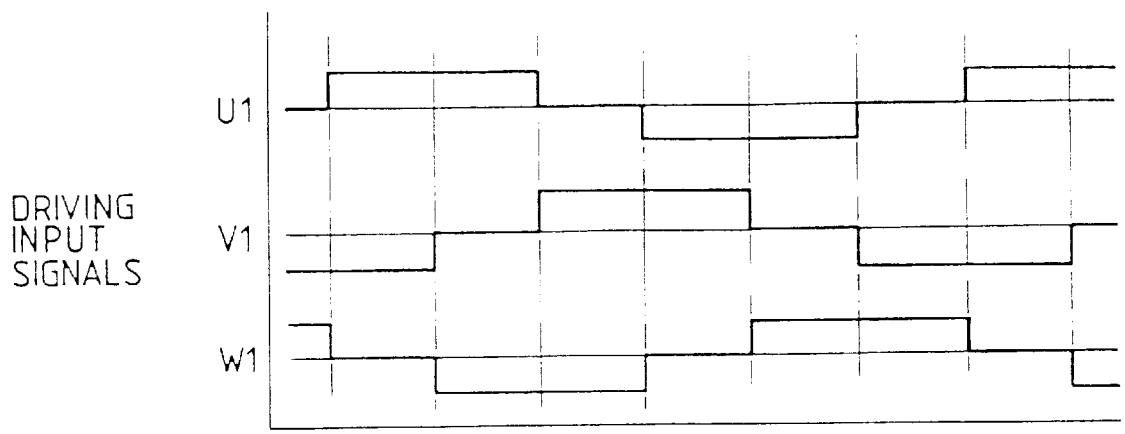
FIG. 4B

Em : AMPLITUDE OF BACK ELECTROMAGNETIC FORCE

Vsat : SATURATION VOLTAGE OF TRANSISTOR $$Vr = \frac{\sqrt{3}}{2} Em + Vsat$$

BRUSHLESS MOTOR DRIVE CIRCUIT INCLUDING A LINEAR AMPLIFIER FOR SENDING AN OUTPUT SIGNAL BASED UPON THE DETECTED BACK ELECTROMOTIVE FORCE VOLTAGE

This is a continuation application of U.S. Ser. No. 08/271,642, filed Jul. 7, 1994, U.S. Pat. No. 5,569,988.

BACKGROUND OF THE INVENTION

The present invention relates to a drive circuit for a d.c. brushless motor, and particularly to a drive circuit for a sensorless multi-phase d.c. brushless motor that is used as a spindle motor of a hard disk drive unit (HDD) or floppy disk drive unit (FDD) for example.

Information processors such as small-scale work stations and personal computers employ a hard disk drive unit and/or floppy disk drive unit for their storage devices. These storage devices operate to write and read out data by means of a magnetic head on a track of a magnetic disk that is rotated by a spindle motor.

With the intention of providing an enhanced processing speed and ability of running large application programs for these information processors, the data recording density on the magnetic disk and the data transfer rate of the hard disk and floppy disk drive units are being improved year by year. At the same time, the size reduction and low-power performance of the hard disk and floppy disk drive units are in progress to match with the compact and low-power design of the information processors.

For the hard disk drive unit, smaller magnetic disks having diameters of 2.5 inches and 1.8 inches are being developed. The hard disk drive unit itself has been made thinner down to 10 mm to meet the demand of thinner lap-top and notebook-type personal computers.

The thickness reduction of the hard disk drive unit has promoted the thinner design of the spindle motor used in it, resulting in the elimination of the rotor position sensor (Hall element) and the development of a sensorless spindle motor of the in-hab type in which the motor windings (coils) are disposed within the rotor. In consequence, there has arisen the need of a motor drive system (sensorless drive system) for controlling accurately the rotation of a sensorless brushless motor having no rotor position sensor.

A conventional drive technique for such a sensorless brushless d.c. motor is described in the article "Sensorless drive for brushless D.C. Motor" in Toshiba Review, Vol. 45, No. 9, pp. 755–758, published by Toshiba Corp. in 1990. According to this technique, when a 3-phase sensorless brushless motor is run at the rated speed, the zero-cross points of the back electromotive force (e.m.f.) voltages Eu, Ev and Ew induced across three motor windings are detected by means of comparators, 3-phase digital pulse signals U1, V1 and W1 are produced by being timed to the detected zero-cross points, the pulse signals U1, V1 and W1 are amplified with individual power amplifiers, and the resulting drive currents are fed to the three motor windings.

A 3-phase d.c. brushless motor is driven in full-wave drive mode in which each motor winding is energized in both current directions or in half-wave drive mode in which each motor winding is energized in one current direction. At the starting of the motor when a large output torque is required, the motor is driven in full-wave drive mode, and after the motor speed enters a certain speed range where a large output torque is not required, the operation is switched to half-wave drive mode.

SUMMARY OF THE INVENTION

However, the foregoing conventional technique has the following problems that are revealed by the inventors of the present invention.

The above-mentioned d.c. brushless motor drive circuit has its 3-phase motor drive currents controlled by the digital pulse signals U1, V1 and W1, and it creates a significant amount of harmful spike noises in the form of voltage, electromagnetic wave and sound at the rise/fall transitions of the drive currents. In order to reduce the spike noises, the inventors of the present invention attempted the through-rate control in which the slope of the rising and falling edges of the drive current is dulled. However, the implementation of through-rate control necessitates a complex circuit arrangement, and it was revealed that the motor driving efficiency falls due to the retarded switching of the conduction phase attributable to the through-rate control.

The brushless motor has its 3-phase windings (coils) Lu, Lv and Lw driven in half-wave mode in such a manner that the neutral point N of the windings is pulled up to the power voltage Vcc. Accordingly, a voltage Vr that is the sum of the voltage of the neutral point N (the power voltage Vcc subtracted by the transistor saturation voltage Vsat) and back e.m.f. voltage Em across the winding (i.e., Vr=Em/2+Vcc−Vsat) is applied to a non-conductive driving transistor. On this account, the three driving transistors are required to have a high withstand voltage enough to cover the voltage Vr, and it is only feasible through the provision of a large transistor forming area on a semiconductor substrate.

Moreover, the driving transistors must operate in a state of continuous variation of the output current in order to control the motor input power for speed control, and it necessitates a complex circuit arrangement.

A prime object of the present invention is to provide a d.c. brushless motor drive circuit that is simple in arrangement and yet capable of reducing the creation of spike noises during the steady-state operation of the motor.

Another object of this invention is to provide a d.c. brushless motor drive circuit that is simple in arrangement and yet operative in half-wave drive mode.

Still another object of this invention is to provide a d.c. brushless motor drive circuit that is simple in arrangement and yet operative in full-wave and half-wave drive modes, while using driving transistors with a lower withstand voltage.

These and other objects and features of this invention will become apparent from the following description taken in conjunction with the accompanying drawings.

The present invention is summarized as follows.

When a d.c. brushless motor is run at the rated speed, the back e.m.f. voltage (induced voltage), which includes the phase information and amplitude information, detected on each motor winding (coil) is applied intact to the control input terminal of the motor driving transistor. This control scheme is capable of relaxing the transition of motor drive current without relying on the through-rate control that causes the deterioration of motor driving characteristics as mentioned previously. Specifically, the back e.m.f. voltage (induced voltage) detected on the motor winding has a sinusoidal waveform, and the motor drive current is produced by the driving transistor based on the phase information and amplitude information included in the detected waveform.

The driving transistor is supplied with a control input voltage having a sinusoidal waveform, and it produces a motor drive current having a slope at the rise/fall transitions instead of instantaneous switching. The resulting trapezoidal drive current waveform suppresses the creation of spike noises at conduction phase switching during the steady-state operation of the brushless motor. Consequently, the intention of reducing the creation of spike noises during the steady-state operation of a brushless motor is accomplished, while retaining the inherent motor driving characteristics and without using a complex circuit arrangement.

In the half-wave drive operation of a brushless motor, one end of each winding is pulled to the ground (first source voltage) through a driving transistor that turns on and off in switching manner in each power voltage cycle, and the neutral point of windings where opposite ends of all windings are connected together is pulled to the supply voltage (second source voltage) through a control transistor that operates continuously. Since one end of each motor winding is tightly grounded through a conductive driving transistor, the supply voltage is not added intact to the back e.m.f. voltage that is applied to the non-conductive transistors.

The driving transistor of each motor winding is turned on or off in switching manner, and therefore the circuit arrangement can be simplified significantly as compared with the case of continuous operation. Consequently, the intention of lowering the withstand voltage of transistors that implement the half-wave driving of a brushless motor is accomplished without using a complex circuit arrangement.

BRIEF DESCRIPTION OF THE DRAWINGS

FIG. 4 is a timing chart showing the operational waveforms of the drive circuit during the synchronous drive operation;

DESCRIPTION OF THE PREFERRED EMBODIMENTS

Preferred embodiments of this invention will be explained with reference to the drawings. Same symbols denote identical items throughout the drawings.

Figure 1:
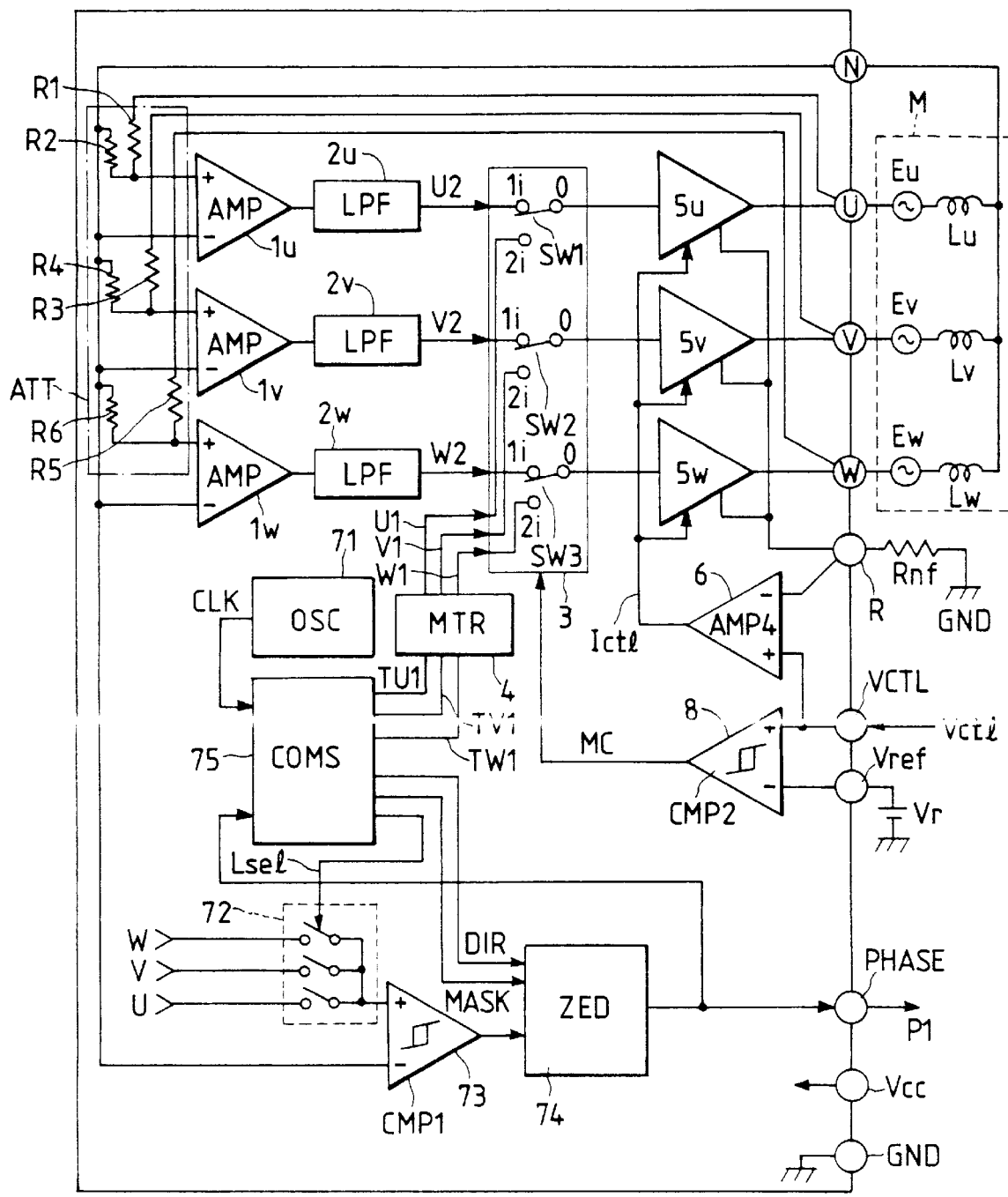
FIG. 1 is a block diagram of the d.c. brushless motor drive circuit based on this invention.

FIG. 1 is a block diagram showing a d.c. brushless motor drive circuit based on this invention. The drive circuit 1 is formed on a square semiconductor substrate of monocrystalline silicon, for example, by the conventional semiconductor integrated circuit fabricating process.

In the figure, the drive circuit 1 is defined by solid lines of a rectangle, with circular symbols that align on it indicating the external terminals of the drive circuit 1, and a 3-phase d.c. brushless motor M having no Hall elements (Hall sensor) as rotor position sensors is defined by dashed lines.

The motor M has three windings (motor coils) Lu, Lv and Lw, with one ends thereof being connected together to make a neutral point. The one ends of the windings and the neutral point are connected to external terminals U, V, W and N of the drive circuit 1. When the motor M runs, back e.m.f. voltages Eu, Ev and Ew are induced on the windings Lu, Lv and Lw, respectively.

The drive circuit 1 includes linear amplifiers (AMPs) 1u, 1v and 1w for detecting the back e.m.f. voltages Eu, Ev and Ew of the motor windings separately, with their pairs of non-inverting and inverting input terminals being connected to the external terminals U, V, W And N through a resistor attenuator ATT. The inverting input terminals of the linear amplifiers 1u, 1v and 1w are connected commonly to the external terminal N.

The linear amplifier 1u has its non-inverting input terminal connected to the node of resistors R1 and R2 of the resistor attenuator ATT, with opposite ends of the resistors R1 and R2 being connected to the external terminals U and N, respectively. Similarly, the linear amplifier 1v has its non-inverting input terminal connected to the node of resistors R3 and R4 of the resistor attenuator ATT, with opposite ends thereof being connected to the external terminals V and N, respectively. Similarly, the linear amplifier 1w has its non-inverting input terminal connected to the node of resistors R5 and R6 of the resistor attenuator ATT, with opposite ends thereof being connected to the external terminals W and N, respectively.

The outputs of the linear amplifiers 1u, 1v and 1w are connected to the inputs of low-pass filters (LPFs) 2u, 2v and 2w, respectively, that are provided for the phase compensation of the feedback loop in which the linear amplifiers 1u, 1v and 1w, output amplifiers 5u, 5v and 5w, and motor windings Lu, Lv and Lw are included. The low-pass Filters are considered as phase compensation means.

The low-pass filters 2u, 2v and 2w have their output signals fed to the first input terminal 1i of switching elements SW1, SW2 and SW3 that constitute a switching circuit 3. The switching elements SW1, SW2 and SW3 have their second input terminals 2i receiving the output signals U1, V1 and W1 of a matrix circuit (MTR) 4 that determines the current conduction ratio for the motor windings Lu, Lv and Lw. The switching elements SW1, SW2 and SW3 of the switching circuit 3 are controlled by a mode control signal MC to select either the output signals U2, V2 and W2 of the low-pass filters 2u, 2v and 2w or the output signals U1, V1 and W1 of the matrix circuit 4.

Output amplifiers 5u, 5v and 5w, which feed drive currents to the motor windings Lu, Lv and Lw, have their input terminals connected to the outputs (o) of the switching elements SW1, SW2 and SW3 to receive the output signals U2, V2 and W2 of the low-pass filters 2u, 2v and 2w or the output signals U1, V1 and W1 of the matrix circuit 4. The output amplifiers 5u, 5v and 5w produce drive currents from the input signals provided by the switching elements SW1, SW2 and SW3, and deliver the currents to the external terminals U, V and W.

A current detecting resistor Rnf, which produces a voltage representing the drive current of the motor winding Lu, Lv or Lw, has one end connected to an external terminal R and another end grounded (first source voltage) in the exterior of the drive circuit 1. The external terminal R is connected to the first (inverting) input of a current control amplifier (AMP 4) 6, which has a second (non-inverting) input connected to another external terminal VCTL. The current control amplifier 6 bases the operation on the difference between the voltage provided by the current detecting resistor Rnf and a speed control voltage Vctl received on the external terminal VCTL, and produces a current control signal Ictl to be fed to the output amplifiers 5u, 5v and 5w.

A clock oscillator (OSC) 71 is provided for producing a clock signal CLK that is used to start up the motor M in the clock-synchronous drive operation. Indicated by 72 is a phase selection switch, 73 is a voltage comparator (CMP), 74 is a zero-cross detector (ZED), 75 is a commutation sequencer (COMS), and 8 is another voltage comparator (CMP), each of which will further be explained shortly.

The switching elements SW1, SW2 and SW3 of the switching circuit 3 are analog switching elements including bipolar transistors (or MOSEFTs), and operate to connect one of their first and second input terminals 1i and 2i to the output amplifiers 5u, 5v and 5w. Switching control of the analog switching elements SW1, SW2 and SW3 is conducted by the mode control signal MC that is produced by the voltage comparator 8 having a hysteresis characteristics.

The voltage comparator 8 has a first (non-inverting) input connected to an external terminal Vref to which a reference voltage Vr is supplied and a second (inverting) input to which the speed control signal Vctl is supplied from an external microcomputer. When the speed control signal Vctl is below a certain reference voltage level Vr, i.e., when the motor M is running in the steady state at the rated speed, the voltage comparator 8 provides a mode control signal MC of a certain level, e.g., high level, for the switching circuit 3 so that the signals U2, V2 and W2 on their first input terminals 1i are delivered to the output amplifiers 5u, 5v and 5w. Otherwise, when the speed control signal Vctl is above the reference voltage level Vr, i.e., when the motor M is accelerating to the rated speed in the synchronous drive operation, the voltage comparator 8 provides a mode control signal MC of a certain level, e.g., low level, for the switching circuit 3 so that the output signals U1, V1 and W1 of the matrix circuit 4 on their second input terminals 2i are delivered to the output amplifiers 5u, 5v and 5w.

The current control amplifier 6 operates on the output amplifiers 5u, 5v and 5w on the basis of negative feedback control to vary the drive currents of the motor windings in response to the speed control signal Vctl. Specifically, the current control amplifier 6 feeds the current control signal Ictl to the output amplifiers 5u, 5v and 5w so that the drive current values of the windings 5u, 5v and 5w, which are detected by the resistor Rnf, match with the speed control signal Vctl.

The phase selection switch 72, voltage comparator 73 and zero-cross detector 74 constitute a back e.m.f. detection circuit for detecting the zero-cross point of the back e.m.f. voltages Eu, Ev and Ew induced on the motor windings Lu, Lv and Lw.

The commutation sequencer 75 produces timing signals TU1, TV1 and TW1 to be fed to the inputs of the matrix circuit 4 by being timed to the motor start-up clock signal CLK or the zero-cross points of the respective back e.m.f. voltages Eu, Ev and Ew. The matrix circuit 4 produces 3-phase pulse signals U1, V1 and W1, which will become the drive signals for the motor M, based on the output signals TU1, TV1 and TW1 of the commutation sequencer 75. The 3-phase pulse signals U1, V1 and W1 are fed to the second input terminals 2i of the selection circuit 3.

The phase selection switch 72, voltage comparator 73, zero-cross detector 74 and commutation sequencer 75 operate as follows.

At the starting of the motor M, the commutation sequencer 75 operates in response to the clock signal CLK provided by the oscillator 71 so that the motor M runs in synchronism with the clock signal. Specifically, the commutation sequencer 75 produces a timing signal in synchronism with the clock signal CLK for switching the conduction phase of the motor windings so that the motor M rotates in the forward direction.

After the motor M has started running, with back e.m.f. voltages Eu, Ev and Ew being induced on the windings Lu, Lv and Lw, the motor drive mode is switched from synchronous driving to back e.m.f. detective driving in which phase switching takes place at the zero-cross points of the back e.m.f. voltages Eu, Ev and Ew with respect to the neutral point (external terminal N). The motor M runs in the forward direction, while retaining the output torque. The phase selection switch 72, voltage comparator 73 and zero-cross detector 74 operate in unison to detect the back e.m.f. voltages Eu, Ev and Ew on the motor windings Lu, Lv and Lw.

The phase selection switch 72 includes three switches having one ends connected to the external terminals U, V and W respectively and opposite ends connected commonly to the first (non-inverting) input of the voltage comparator 73, which has a second (inverting) input connected to the external terminal N. The voltage comparator 73 has its comparison output fed to the zero-cross detector 74, by which information on the zero-cross points of the back e.m.f. voltages Eu, Ev and Ew with respect to the neutral point voltage are imparted to the commutation sequencer 75. The commutation sequencer 75 produces the output signals TU1, TV1 and TW1 based on the zero-cross information and feeds the signals to the inputs of the matrix circuit 4. The matrix circuit 4 bases the operation on the signals TU1, TV1 and TW1 to produce the 3-phase pulse signals U1, V1 and W1 that will become the drive input signals for the motor M.

Since the back e.m.f. voltage can be detected only on a non-conduction winding during the back e.m.f. detective drive operation, the commutation sequencer 75 issues a phase selection signal Lsel to the phase selection switch 72 so that only the back e.m.f. voltage of a non-conduction winding is detected selectively. In order to prevent the erroneous detection of back e.m.f. due to the kick-back of the motor M immediately after the switching of conduction phase, the commutation sequencer 75 issues a mask signal MASK to the zero-cross detector 74 so that the zero-cross detection is disabled for a while immediately after the conduction phase switching. The output signal of the zero-cross detector 74 is also delivered to the external terminal PHASE so that it is used as a motor speed signal by a microcomputer that is connected externally to the motor drive circuit 1.

The commutation sequencer 75 provides a zero-cross detection direction signal DIR for the zero-cross detector 74. The signal DIR specifies the direction of zero-crossing of the back e.m.f. voltages Eu, Ev and Ew with respect to the voltage of neutral point N of the motor windings, i.e., falling of the voltage below the neutral point voltage or rising of the voltage above the neutral point voltage, so that the zero-cross time point is detected accurately.

During the steady-state operation of the motor M when it runs at the rated speed, the linear amplifiers 1u, 1v and 1w and low-pass filters 2u, 2v and 2w provide the 3-phase sinusoidal signals U2, V2 and W2, which retain the sinusoidal waveform of the back e.m.f. voltages Eu, Ev and Ew, for the output amplifiers 5u, 5v and 5w by way of the first input terminals 1i of the selection circuit 3. Namely, during the steady-state operation at the rated speed, the phase information and amplitude information carried by the back e.m.f. voltages detected on the motor windings Lu, Lv and Lw are used intact for the drive input signals of the motor M.

Specifically, the back e.m.f. voltages of the motor windings are applied intact to the control input terminals of driving transistors of the output amplifiers 5u, 5v and 5w. The detected back e.m.f. voltages have a sinusoidal waveform, and the driving transistors of the output amplifiers 5u, 5v and 5w produces drive currents to be fed to the motor windings Lu, Lv and Lw based on the phase information and amplitude information of the waveform. Accordingly, the drive currents have a certain slope at their rise/fall transitions to form a trapezoidal waveform, instead of having an instantaneous switching. These sloping transitions of the drive currents suppress the creation of spike noises at the phase switching during the steady-state operation of the brushless motor M.

Figure 2:
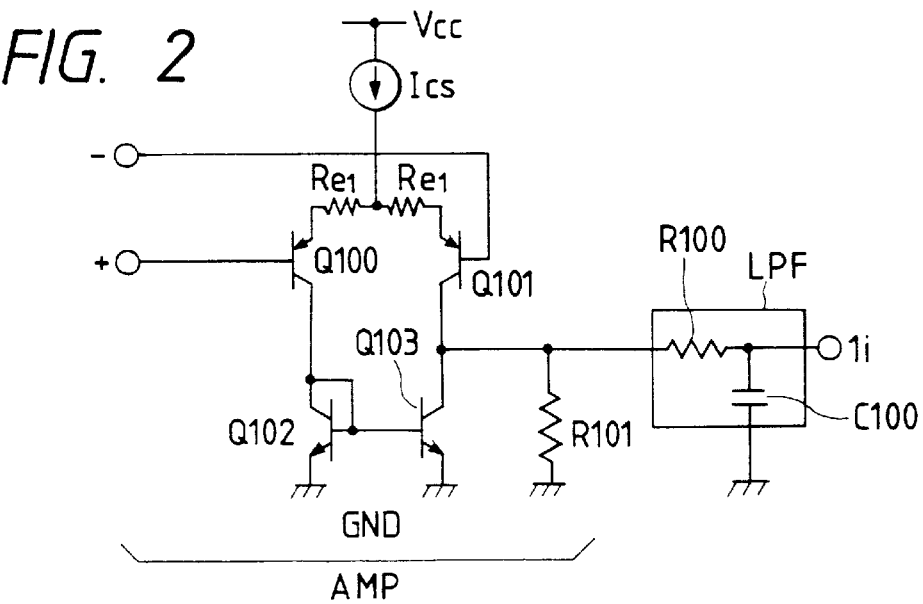
FIG. 2 is a schematic diagram showing an embodiment of the linear amplifier and low-pass filter shown in FIG. 1.

FIG. 2 shows a specific circuit arrangement of the linear amplifiers 1u, 1v and 1w and low-pass filters 2u, 2v and 2w. The linear amplifier (AMP) includes a pair of pnp-type bipolar transistors Q100 and Q101 having their base electrodes connected to the non-inverting and inverting input terminals, respectively, of the amplifier. The transistors Q100 and Q101 have their emitter electrodes connected with respective emitter resistors Re1 and Re2, which have opposite ends connected together and supplied with the power voltage (second source voltage) Vcc of the drive circuit 1 through a constant current source Ics.

The transistors Q100 and Q101 have their collector electrodes connected to the collector electrodes of a pair of npn-type bipolar transistors Q102 and Q103, respectively. The transistor Q102 has its base and collector electrodes connected together in diode configuration. The base electrode of the transistor Q102 is further connected to the base electrode of the transistor Q103, and their emitter electrodes are grounded (first source voltage) of the motor drive circuit 1. Accordingly, the transistors Q102 and Q103 form a load circuit for the transistors Q100 and Q101 in a current mirror circuit.

The transistor Q101 has its collector electrode connected to the first input 1i of the switching circuit 3 through a low-pass filter (LPF) consisting of a resistor R100 and capacitor C100, and also connected to a load resistor R101. Accordingly, the linear amplifier (AMP) produces a sinusoidal voltage output in response to the voltage signals received on its non-inverting and inverting input terminals, and the output voltage is fed through the low-pass filter (LPF) to the first input terminal 1i of a switch element in the switching circuit 3.

Figure 3:
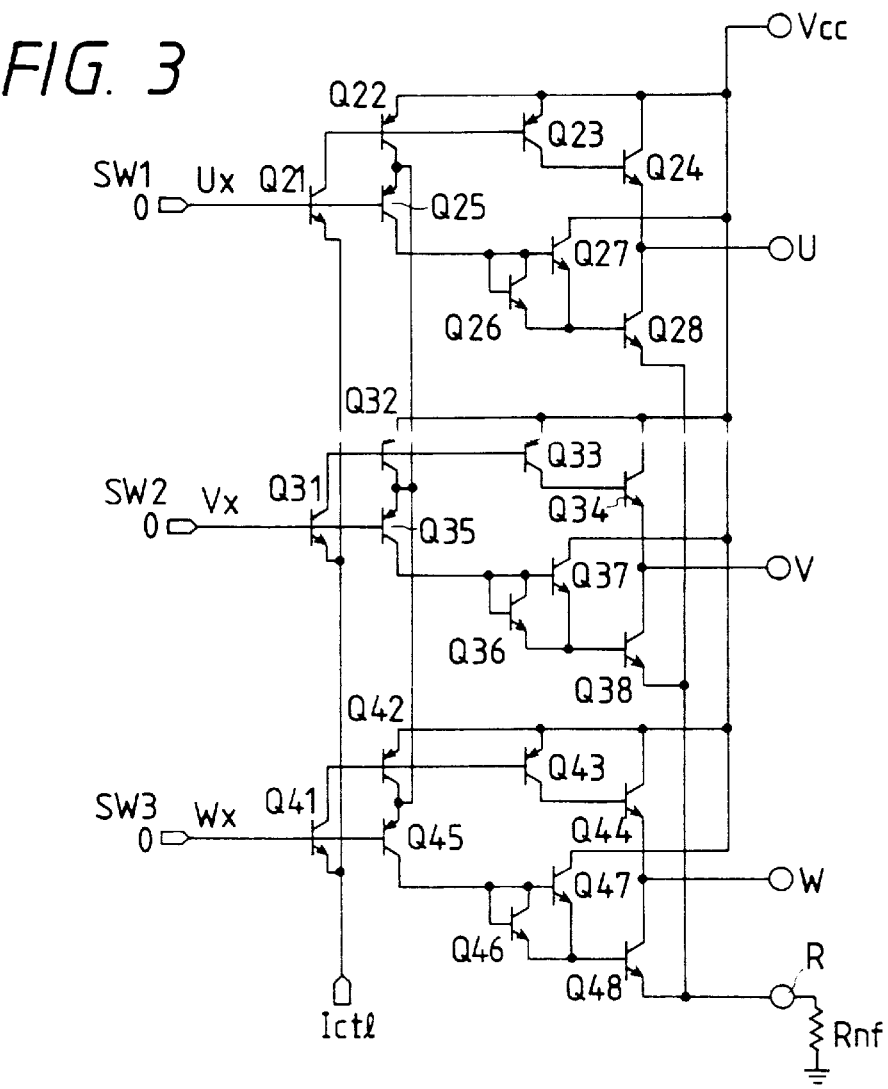
FIG. 3 is a schematic diagram showing an embodiment of the output amplifier shown in FIG. 1.

FIG. 3 shows a specific circuit arrangement of the output amplifiers 5u, 5v and 5w in the motor drive circuit 1. Although the operation of the circuit shown in FIG. 3 is easily understandable for those skilled in the art, it will be briefed in the following.

In the output amplifiers 5u, 5v and 5w, three pairs of npn-type bipolar transistors Q24 and Q28, Q34 and Q38, and Q44 and Q48 form push-pull output stages for driving the motor windings Lu, Lv and Lw, respectively. The transistors Q24, Q34 and Q44 are current sourcing transistors, while the transistors Q28, Q38 and Q48 are current sinking transistors. Three pnp-type bipolar transistors Q23, Q33 and Q43 produce base currents for the output transistors Q24, Q34 and Q44. Three pairs of npn-type bipolar transistors Q26 and Q27, Q36 and Q37, and Q46 and Q47 produce base currents for the output transistors Q28, Q38 and Q48, respectively.

Three npn-type bipolar transistors Q21, Q31 and Q41 having a common emitter form a three-differential amplifier, in which only one transistor provided with the highest base voltage among them becomes conductive, with remaining transistors being cut off. The conductive transistor turns on the current sourcing output transistor in connection with its collector electrode. The transistors Q21, Q31 and Q41 have their base electrodes (control input terminals) connected to the output terminals (o) of the switching elements SW1, SW2 and SW3 in the switching circuit 3.

Three pnp-type bipolar transistors Q25, Q35 and Q45 also form a common emitter three-differential amplifier, in which only one transistor provided with the lowest base voltage among them becomes conductive, with remaining transistors being cut off. The conductive transistor turns on the current sinking output transistor in connection with its collector electrode. The pnp-type bipolar transistors Q22, Q32 and Q42 are used as current sources for the pnp-type bipolar transistors Q25, Q35 and Q45.

Power control for driving the motor windings takes place by being responsive to the drive current that is detected by the current sensing resistor Rnf connected between the common emitter of the current sinking output transistors Q28 Q38 and Q48 and the ground. The current control amplifier 6 feeds the current control signal Ictl to the common emitter of the transistors Q21, Q31 and Q41 based on the drive current detected by the current sensing resistor Rnf, as has been explained on FIG. 1.

The transistors Q21, Q31 and Q41 become conductive, one at a time alternately, in response to the 3-phase signal Ux, Vx and Wx supplied from the output terminals (o) of the switching elements SW1, SW2 and SW3 in the switching circuit 3, and accordingly the current sourcing transistors Q24, Q34 and Q44 become conductive, one at a time alternately, in accordance with the conduction phase. At the same time, one of the transistors Q25, Q35 and Q45 of the three-differential amplifier provided with the lowest base voltage becomes conductive, causing a current sinking output transistor in connection with it to become conductive, and the motor M runs in full-wave drive mode.

FIG. 4 shows the waveforms of the signals U1, V1 and W1 produced by the matrix circuit 4 together with the motor start-up clock signal CLK during the motor starting period. The motor M is started in the CLK-synchronous drive operation, as has been explained previously. The 3-phase pulse signals U1, V1 and W1 produced from the CLK signal by the matrix circuit 4 are supplied as drive input signals to the output amplifiers 5u, 5v and 5w by way of the switching circuit 3.

FIG. 5 shows the waveforms of the back e.m.f. voltages and the output signals U1, V1 and W1 of the matrix circuit 4 during the back e.m.f. detective drive operation for accelerating the motor M that has started to the rated speed. The 3-phase pulse signals U1, V1 and W1 produced by the matrix circuit 4 based on the zero-cross points of the detected back e.m.f. voltages Eu, Ev and Ew are supplied as drive input signals to the output amplifiers 5u, 5v and 5w by way of the switching circuit 3.

FIG. 6 shows the waveforms of the back e.m.f. voltages Eu, Ev and Ew, the outputs of the low-pass filters 2u, 2v and 2w, and the motor winding drive currents during the steady-state operation after the motor speed has reached the stated speed. In this drive mode, the phase information and amplitude information of the back e.m.f. voltages Eu, Ev and Ew are used intact for driving the motor M, and it may be called "soft-switching drive operation". In the steady-state operation of the motor M, the back e.m.f. voltages on the motor windings Lu, Lv and Lw detected by the linear amplifiers 1u, 1v and 1w are fed through the low-pass filters 2u, 2v and 2w, and thereafter the resulting signals are supplied as drive input signals to the output amplifiers 5u, 5v and 5w by way of the switching circuit 3.

It should be noted that a closed circuit formed by the motor winding Lu (or Lv or Lw), linear amplifier 1u (or 1v or 1w), low-pass filter 2u (or 2v or 2w), and output amplifier 5u (or 5v or 5w) is a sort of positive feedback loop that affects the control stability. However, the motor drive current in the steady-state operation is made small by the current control signal Ictl from the current control amplifier 6, and the loop gain of this positive feedback is small enough to prevent the control system from entering the unstable operation.

Furthermore, the inventive motor drive circuit is provided with the low-pass filters 2u 2v and 2w in the positive feedback loop so as to prevent the loop gain from rising in the high frequency region of control characteristics. In addition, an attenuator ATT is inserted in the positive feedback loop for the adjustment of the total loop gain. Based on the gain reduction by the attenuator ATT, phase compensation by the low-pass filters 2u, 2v and 2w, and control of current conduction of the output amplifiers 5u, 5v and 5w by the current control amplifier 6, the positive feedback loop gain can surely be lowered.

Consequently, even if a positive feedback loop is formed during the soft-switching drive of the motor drive circuit 1, it can surely be prevented from entering the unstable operation. In other words, the phase compensating low-pass filters 2u, 2v and 2w are used for dealing with the positive feedback loop that emerges inevitably during the soft-switching drive. Since the control stability is jeopardized by the positive feedback when the output amplifiers 5u, 5v and 5w have a large gain to produce a large motor drive current, the motor drive circuit 1 is switched to the soft-switching drive after the motor speed has reached the rated speed and the drive current has decreased.

As shown in FIG. 6, the motor winding drive currents having a flat peak have a smooth waveform at the rise/fall transitions that cause the creation of spike noises. Specifically, the driving transistors of the output amplifiers 5u, 5v and 5w receives the back e.m.f. voltages of a sinusoidal waveform on their control inputs, and therefore the resulting drive currents have sloping rise/fall transitions to form trapezoidal waveforms, instead of having an instantaneous switching waveform. Consequently, the creation of spike noises at phase switching is suppressed effectively during the steady-state operation of the brushless motor. It will be appreciated from the circuit arrangement of the output amplifiers 5u, 5v and 5w shown in FIG. 3 that the sloping rise/fall transitions of the drive current waveforms are derived from the application of the sinusoidal input signals to the base electrodes (control inputs) of driving transistors Q21, Q31, 421, Q25, Q35 and Q45.

FIG. 7 shows the operating modes of the motor drive circuit 1 across the entire speed range of the motor M. Speed range A is for the motor starting period, in which the motor drive circuit 1 starts the motor M in the clock-synchronous drive operation. The mode control signal MC is brought to a low level, and the output amplifiers 5u, 5v and 5w produce the maximum drive currents as shown by the waveform of current value detected by the current sensing resistor Rnf.

Speed range B is for the motor acceleration period after the motor M has started until it reaches the rated speed, in which the motor drive circuit 1 drives the motor M in the back e.m.f. detective drive operation. The mode control signal MC is kept low, and the output amplifiers 5u, 5v and 5w produce the maximum drive currents as shown by the waveform of current value detected by the current sensing resistor Rnf.

Speed range C is for the period of the motor steady-state operation after the motor M has reached the rated speed, in which the motor drive circuit 1 drives the motor M in the soft-switching drive operation. The mode control signal MC is brought to high, and the output amplifiers 5u, 5v and 5w produce small drive currents for the motor operation at the rated speed as shown by the waveform of current value detected by the current sensing resistor Rnf.

Figure 8:
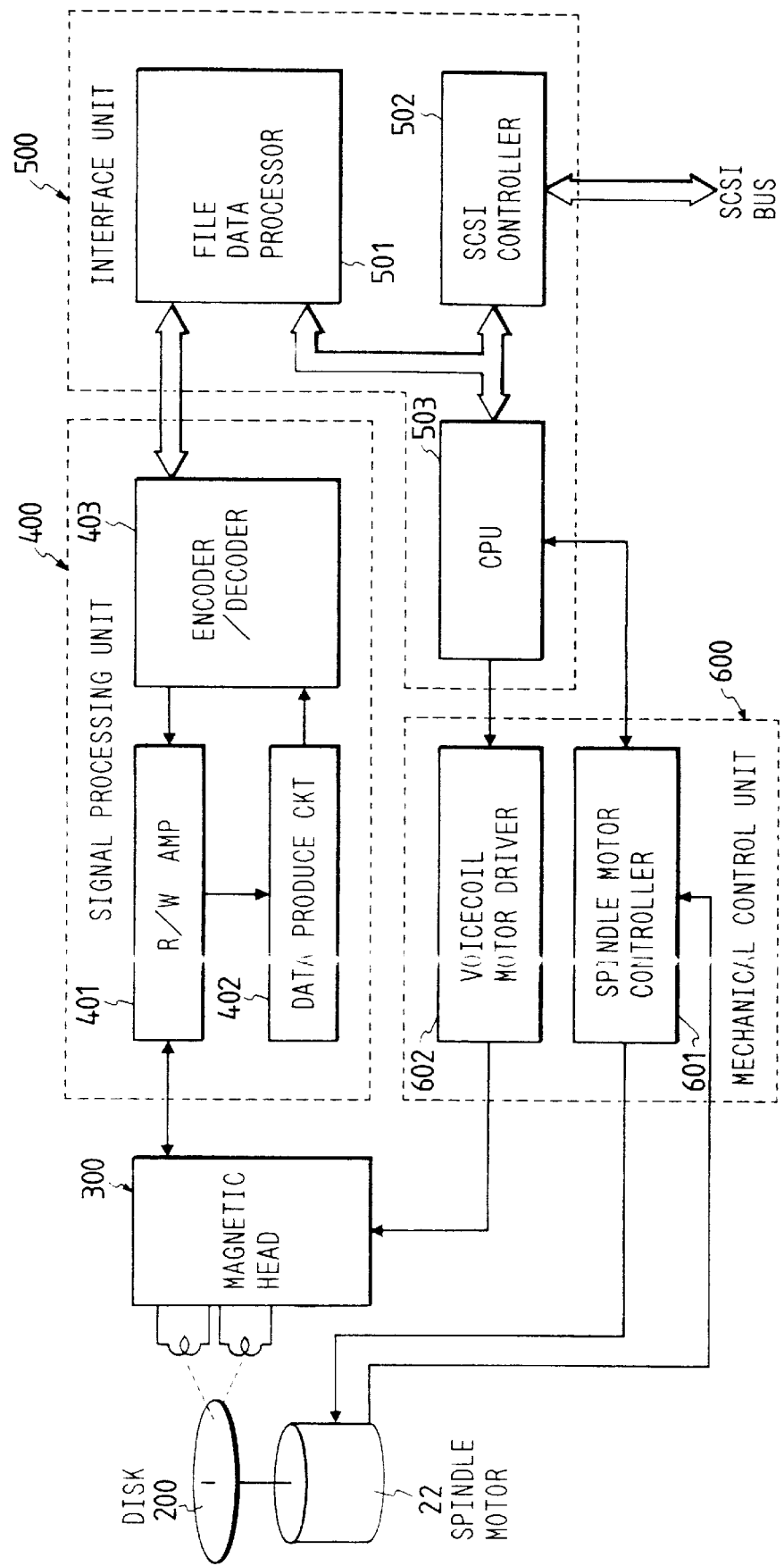
FIG. 8 is a block diagram of a disk memory drive unit using the motor drive circuit of FIG. 1.

FIG. 8 is a block diagram showing a disk memory drive unit, e.g., hard disk drive unit (HDD), in which the motor drive circuit 1 shown in FIG. 1 is used for the spindle motor controller as indicated by 1. The hard disk drive unit includes a spindle motor 22 that compares to the motor M in FIG. 1, a magnetic head 300 for reading out or writing data on a specified track of a magnetic disk 200 that is rotating by being driven by the spindle motor 22, a signal processor 400 which implements a prescribed process for data to be written or read out of the disk, an interface circuit 500 which transacts control signals and data with an external system, and a servo controller 600 which drives the spindle motor 22 and magnetic head 300. The spindle motor controller 1 which controls the operation of the motor 22 is included in the servo controller 600.

The signal processor 400 includes a data read/write amplifier 401 which is connected to the magnetic head 300, a data reproduction circuit 402, and a data encoder/decoder 403. The interface circuit 500 includes a file data processor 501, a SCSI (small computer system interface) controller 502, and a microprocessor (CPU) 503. The servo controller 600 includes a voicecoil motor driver which drives the magnetic head 300, in addition to the spindle motor controller 1.

The spindle motor controller 1 delivers the output signal of the zero-cross detector 74 shown in FIG. 1 through the external terminal PHASE to the microprocessor 503, which then produces a speed control signal Vctl from it and sends the signal back to the external terminal Vctl of the spindle motor controller 1. Accordingly, the speed of the spindle motor 22 is controlled by the spindle motor controller 1.

During the steady-state operation of the spindle motor 22, the motor drive currents are controlled in a sinusoidal manner at least for phase switching so that spike noise creation is alleviated. This control scheme is capable of relaxing the transitional motor drive current without relying on the through-rate control that causes the deterioration of motor driving characteristics, and consequently the creation of spike noises during the steady-state operation of the d.c. brushless motor is alleviated, while retaining the motor driving characteristics and without using a complex circuit arrangement.

Although the present invention has been explained for its specific embodiment, the invention is not confined to it, but various alterations are possible within the scope of the invention. For example, the switching circuit 3 may be controlled in response to the motor speed which is detected from the back e.m.f. voltage of the motor.

Although the foregoing embodiment is a 3-phase d.c. brushless motor drive circuit, the present invention is not confined to it, but is applicable to a variety of multi-phase motor drive circuits.

Next, another embodiment of this invention will be explained with reference to the drawings.

Figure 9:
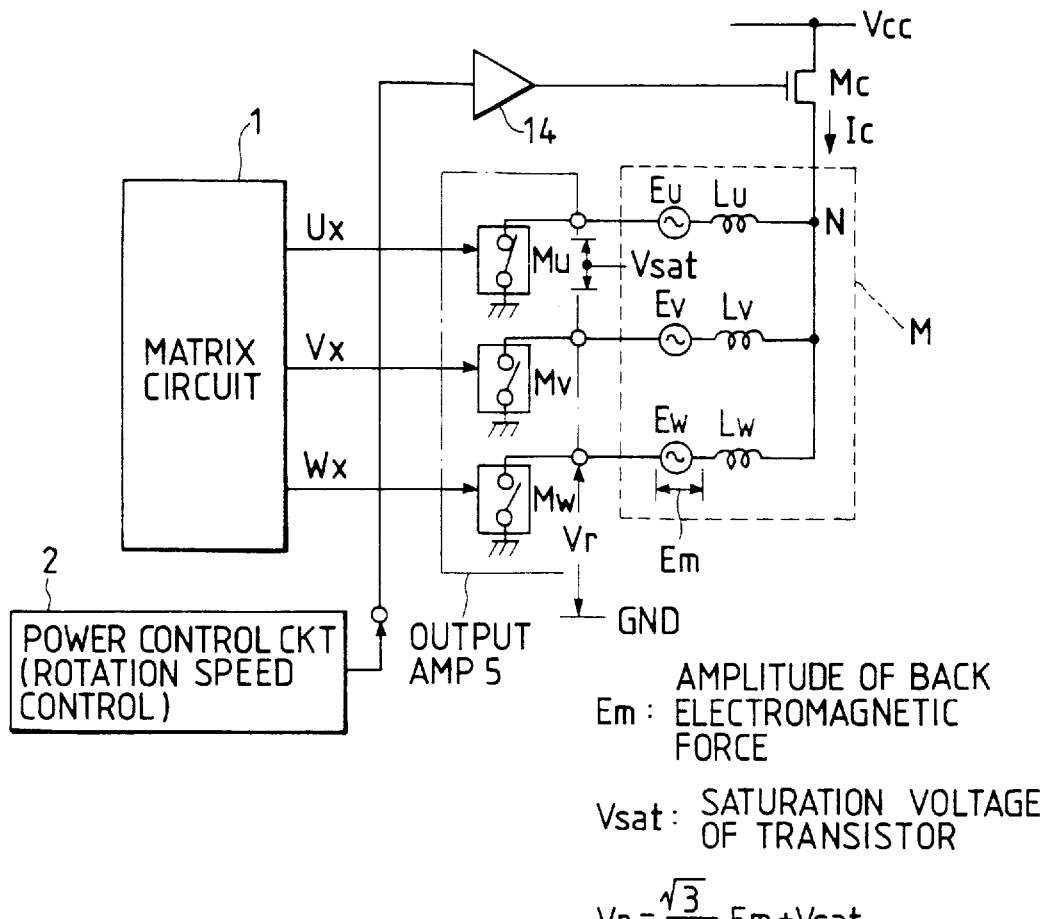
FIG. 9 is a diagram showing an equivalent circuit of the half-wave drive circuit for a brushless motor based on this invention.

FIG. 9 shows a brushless motor half-wave drive circuit based on an embodiment of this invention, in which indicated by M is a 3-phase d.c. brushless motor, Lu, Lv and Lw are motor windings (coils), Em (Eu, Ev and Ew) is a back e.m.f. voltage induced on each winding, Mu, Mv and Mw are power field-effect transistors (FETs) as driving transistors included in an output amplifier set 5 which selectively connects one end of each motor winding to the ground, Mc is a power FET that connects the opposite ends of all windings (neutral point N) commonly to the power voltage Vcc, 14 is an amplifier that operates continuously to drive the transistor Mc in connection with the neutral point N, and 2 is a power control circuit (speed control circuit).

Next, the operation will be explained. The transistors Mu, Mv and Mw in connection with one ends of the motor windings Lu, Lv and Lw are turned on and off by the multi-phase signals Ux, Vx and Wx provided by a matrix circuit 1 so that the ends of the windings Lu, Lv and Lw are grounded alternately. The transistors Mu, Mv and Mw have either the saturated conductive state or cutoff state, and do not have a continuous conductive state.

In contrast, the transistor Mc in connection with the neutral point N of the motor windings Lu, Lv and Lw is operated to have a continuous conductive state by the control signal supplied by the power control circuit 2 through the amplifier 14 so that it varies the drive current Ic supplied from the power voltage Vcc to the neutral point N.

Accordingly, the brushless motor M has its windings Lu, Lv and Lw driven at one ends in half-wave drive mode by the switching operation of the transistors Mu, Mv and Mw and driven at the neutral point N in continuous drive mode by the transistor Mc, so that the motor input power is controlled for speed control.

Figure 10:
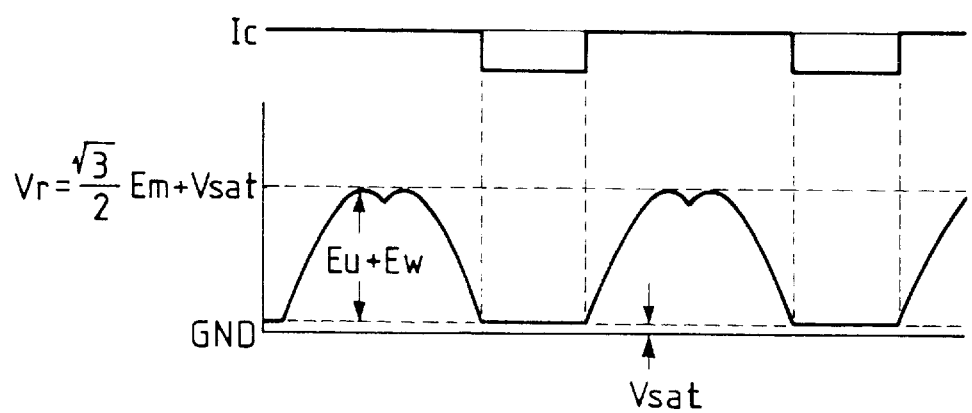
FIG. 10 is a waveform diagram showing the operation of the circuit shown in FIG. 9.

Cutoff transistors have the application of a voltage that is the sum of the two back e.m.f. voltages induced on a motor winding of the conduction phase and motor windings of the non-conduction phases. For example, in case the transistor Mu is conductive and the transistors Mv and Mw are cut off, the sum of the back e.m.f. voltages Eu and Ew of the windings Lu and Lw are applied to the transistor Mw. However, the two back e.m.f. voltages Eu and Ew are out of phase with each other, and therefore the peak level of the summed voltage Eu+Ew is significantly lower than the sum of the peak levels of Eu and Ew. Moreover, the motor winding Lu that produces the back e.m.f. voltage Eu has its one end grounded by the conductive transistor Mu in a saturated state, and therefore the voltage Vr applied to the transistor Mw of non-conduction phase is not more than the above-mentioned summed voltage Eu+Ew plus the saturation voltage Vsat of the transistor Mu as shown in FIG. 10. Another transistor Mv of non-conduction phase has the same situation.

Based on the conduction of one end of the motor winding Lu to the ground through the saturated transistor Mu, the power voltage Vcc is not added intact to the back e.m.f. voltages applied to the transistors Mv and Mw of non-conduction phases. The transistors Mu, Mv and Mw that select a conduction phase of the motor windings Lu, Lv and Lw are operated in switching mode, and therefore the circuit arrangement can be simplified significantly as compared with the case of the continuous operation. Consequently, the withstand voltage required of the transistors Mu, Mv and Mw that implement the half-wave driving of the brushless motor M can be lowered without being based on a complex circuit arrangement.

Figure 11:
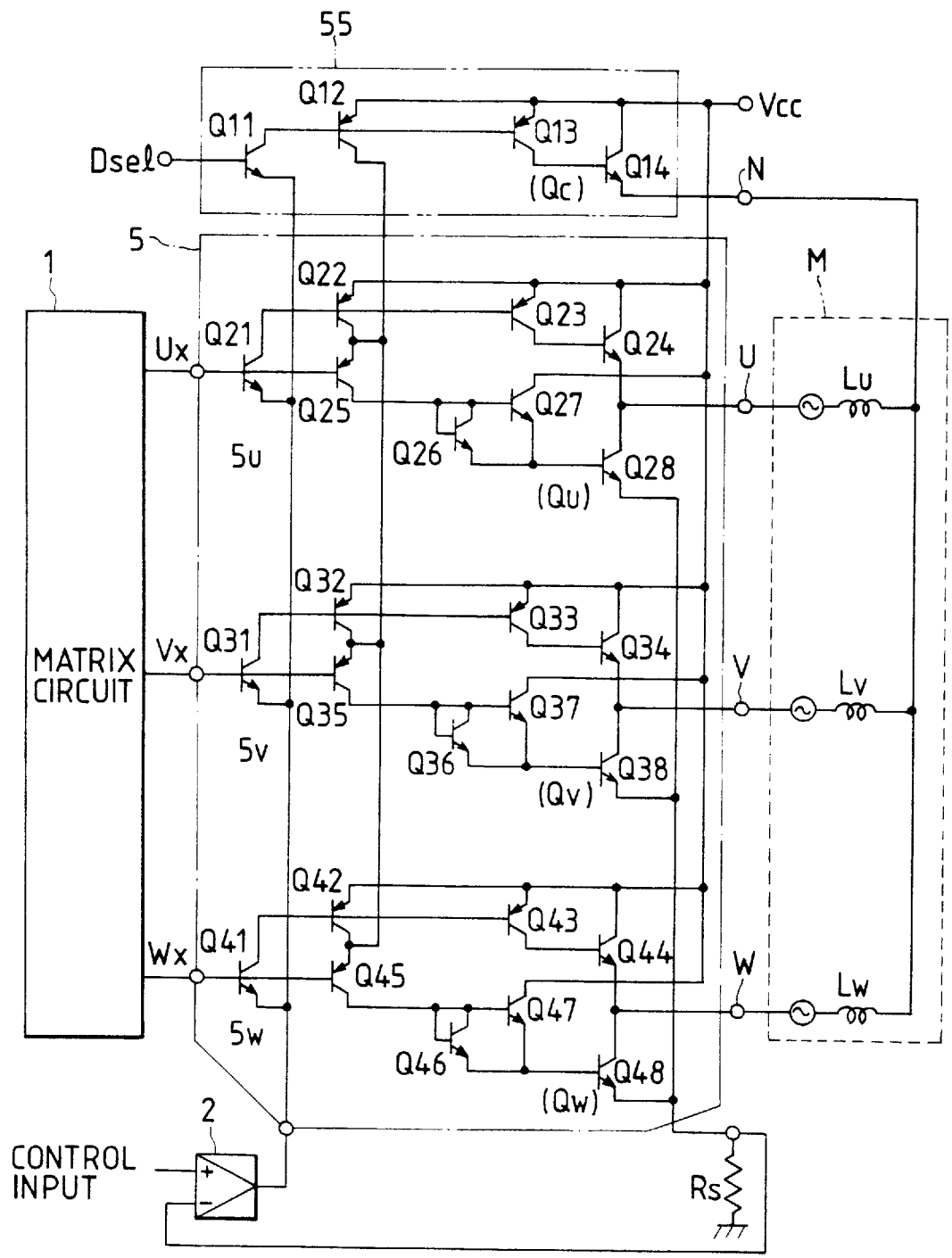
FIG. 11 is a schematic diagram of the output amplifier based on another embodiment of this invention.

FIG. 11 shows a specific circuit arrangement of the output amplifier 5 that is configured by use of bipolar transistors Q11–Q48 of pnp and npn types. The output amplifier 5 is designed to drive a 3-phase d.c. brushless motor in either full-wave or half-wave drive mode by switching. The output amplifier 5 includes three output stages 5$u$, 5$v$ and 5$w$ for driving windings Lu, Lv and Lw of a motor M, and it is accompanied by a control circuit 55 that switches the output amplifier 5 to operate in full-wave or half-wave drive mode.

Three pairs of npn-type bipolar transistors Q24 and Q28, Q34 and Q38, and Q44 and Q48 form push-pull output stages for driving the motor windings Lu, Lv and Lw, respectively. Among these transistors, Q24, Q34 and Q44 are current sourcing output transistors, while Q28, Q38 and Q48 are current sinking output transistors. Three npn-type transistors Q23, Q33 and Q43 produce base currents for the driving transistors Q24, Q34 and Q44, respectively.

Three pairs of npn-type bipolar transistors Q26 and Q27, Q36 and Q37, and Q46 and Q47 produce base currents for the driving transistors Q28, Q38 and Q48, respectively. The transistor pairs Q26 and Q27, and Q36 and Q37 have their current mirror ratio selected such that the current sinking output transistors Q28 and Q38 are loaded more than the current sourcing output transistors Q24 and Q34.

Four npn-type bipolar transistors Q11, Q21, Q31 and Q41 form a four-differential amplifier, in which only one transistor provided with the highest base voltage among them becomes conductive, with remaining transistors being cut off. The conductive transistor turns on the current sourcing output transistor in connection with its collector electrode. Three pnp-type bipolar transistors Q25, Q35 and Q45 having a common emitter electrode form a three-differential amplifier, in which only one transistor provided with the lowest base voltage among them becomes conductive, with remaining transistors being cut off. The conductive transistor turns on the current sinking output transistor in connection with its collector electrode.

With the drive mode selecting signal Dsel being set to have a voltage level so that the base voltage (control input) of Q11 is always highest with respect to the base voltages of Q21, Q31 and Q41, the npn-type bipolar transistors Q12 and Q13 and pnp-type bipolar transistor Q14 are made conductive and the current sourcing output transistors Q24, Q34 and Q44 are cut off, and only the current sinking transistors Q28, Q38 and Q48 operate to turn on and off, thereby driving the motor M in half-wave drive mode. In this operation, the transistor Q12 functions as a current source for the transistors Q25, Q35 and Q45, with remaining transistor sets Q21, Q31 and Q41 and Q22, Q32 and Q42 being kept inert.

The transistor Q14 operates continuously to control the drive power that is fed to the motor M through the neutral point N. The power control takes place by being responsive to the drive current that is detected by the current sensing resistor Rs connected between the common emitter of the current sinking output transistors Q28 Q38 and Q48 and the ground.

With the drive mode selecting signal Dsel being set to have a voltage level so that the base voltage of Q11 is always lowest with respect to the base voltages of Q21, Q31 and Q41, the transistors Q11, Q12, Q13 and Q14 are made cutoff and the transistors Q21, Q31 and Q41 operate to turn on and off alternately in response to the multi-phase signal Ux, Vx and Wx, causing the following current sourcing output transistors Q24, Q34 and Q44 to become conductive alternately. The pnp-type bipolar transistors Q22, Q32 and Q42 function as current sources for the transistors Q25, Q35 and Q45. At the same time, one of the transistors Q25, Q35 and Q45 of three-differential amplifier having the lowest base voltage becomes conductive, causing the following current sinking output transistor to become conductive. Accordingly, the motor M is driven in full-wave drive mode.

Figure 12:
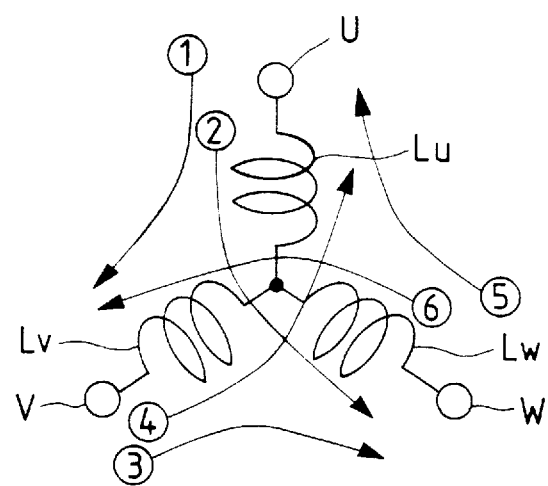
FIG. 12 is a diagram explaining the sequence of driving of the motor windings and the current flowing directions in full-wave drive mode.
Figure 13:
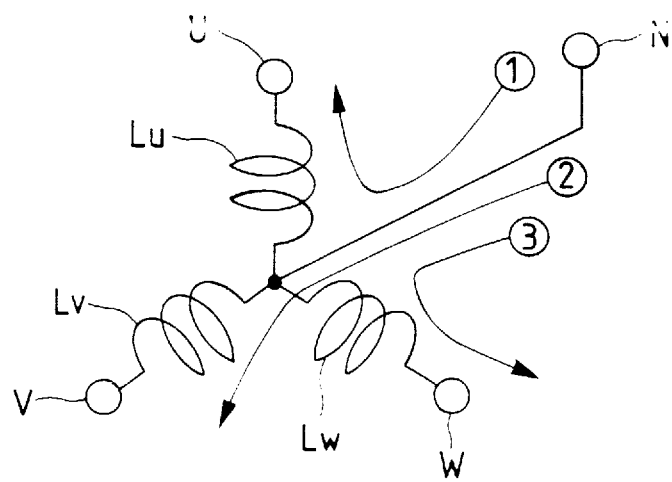
FIG. 13 is a diagram explaining the sequence of driving of the motor windings and the current flowing directions in half-wave drive mode.

FIG. 12 shows the order of current conduction on the motor winding in full-wave drive mode, in which the drive currents flow through the windings Lu, Lv and Lw in the order of $\hat{1}, \hat{2}, \hat{3}, \hat{4}, \hat{5}$ and $\hat{6}$ as shown. FIG. 13 shows the order of current conduction on the motor winding in half-wave drive mode, in which the drive currents from the neutral point N flow through the windings Lu, Lv and Lw in the order of $\hat{1}, \hat{2}$ and $\hat{3}$ as shown.

Figure 14:
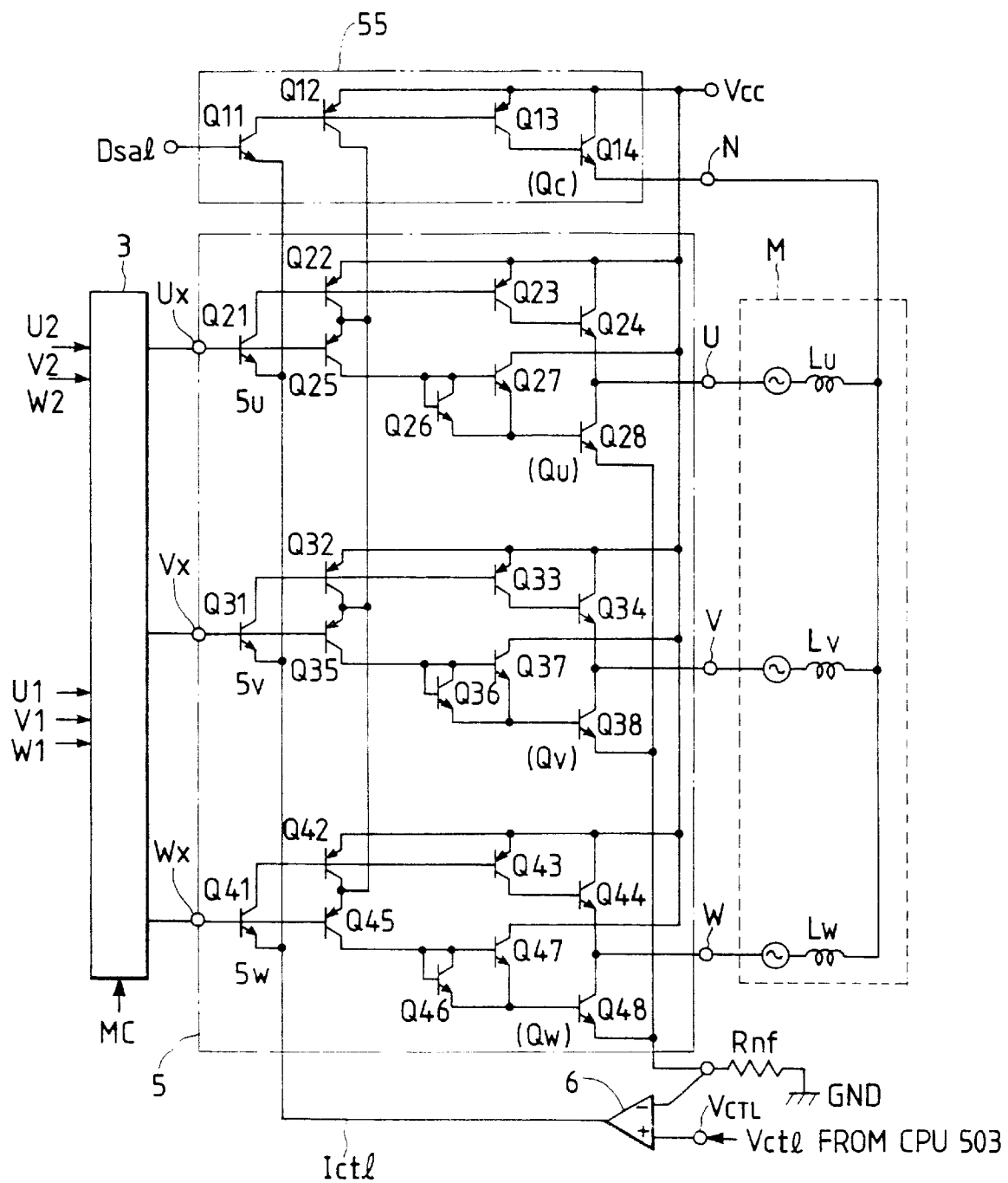
FIG. 14 is a schematic diagram showing the circuit arrangement of the output amplifier shown in FIG. 1 to which the output amplifier circuit of FIG. 11 is applied.

FIG. 14 is a schematic diagram showing another circuit arrangement of the output amplifier, which is similar to the one shown in FIG. 11, used in the motor drive circuit 1 of FIG. 1. This circuit arrangement differs from that of FIG. 11 only in the replacement of the matrix circuit 4 with the switching circuit 3 shown in FIG. 1. Accordingly, the transistor pairs Q21 and Q25, Q31 and Q35, and Q41 and Q45 have their base electrodes (control inputs) connected to the output terminals (o) of the switching elements SW1, SW2 and SW3 in the switching circuit 3.

The transistor Q11 is supplied for its base input with the drive mode switching signal Dsel from the CPU 503 shown in FIG. 8 on the external terminal of the motor drive circuit 1. The CPU 503 issues the switching signal Dsel to switch full-wave drive mode to half-wave mode of the motor operation when the motor speed approaches the rated speed.

The motor drive circuit 1 drives the motor M in the clock-synchronous drive operation to start the motor M, and when the back e.m.f. voltages Eu, Ev and Ew are induced on the windings Lu, Lv and Lw by the rotation of the motor, it switches the drive mode to the back e.m.f. detective drive operation in which the conduction phase is switched based on the detection of zero-cross points of the back e.m.f. voltages Eu, Ev and Ew with respect to the voltage of the neutral point (external terminal N). When the motor speed approaches the rated speed No that is recognized from the speed signal P1 provided by the motor drive circuit 1 (refer to FIG. 1) in the speed range B of FIG. 7, the CPU 503 sends the drive mode switching signal Dsel to the external terminal of the motor drive circuit 1 so that drive mode is switched from full-wave drive mode to half-wave drive mode.

When the motor speed reaches the rated speed No, the motor drive circuit 1 is switched to soft-switching drive mode of the speed range C in which the phase information and amplitude information of the detected back e.m.f. voltages are used intact. Specifically, the switching circuit 3 responds to the mode switching signal MC to select the 3-phase sinusoidal signals U2, V2 and W2 provided through the linear amplifiers 1u, 1v and 1w and low-pass filters 2u, 2v and 2w, in place of the outputs U1, V1 and W1 of the matrix circuit 4, for the drive input signals of the output amplifiers 5u, 5v and 5w. Accordingly, the motor M is driven in half-wave drive mode during the soft-switching drive.

Accordingly, the motor M is driven in full-wave drive mode immediately after it has started when a large output torque is required, and after the motor speed reaches a certain speed level, the drive mode is switched to half-wave drive mode and it is further accelerated. After the motor speed reaches the stated speed, the motor M is driven in half-wave drive mode of soft-switching drive so that the creation of spike noises decreases.

FIG. 15 shows the voltage and current waveforms when the motor M runs in half-wave drive mode during the soft-switching drive. In contrast to the waveforms of FIG. 6, drive currents are fed to the motor windings Lu, Lv and Lw only in the negative half cycle of the back e.m.f. voltages induced on the windings.

In this manner, the motor drive mode is easily switched between full-wave driving and half-wave driving. In half-wave drive mode, one end of the motor winding of conduction phase is tightly grounded by a transistor, and consequently it becomes possible to prevent the power voltage from being added intact to the back e.m.f. voltages applied to transistors of non-conduction phases.

Although a specific embodiment of the present invention has been explained, the invention is not confined to this embodiment, but various alterations are possible within the scope of the invention.

Although the foregoing embodiment is mainly devoted to a half-wave drive circuit for a 3-phase d.c. brushless motor, the present invention is not confined to it, but is applicable to half-wave drive circuits for a variety of multi-phase motors.

The effectiveness attained by this invention is as follows.

It is possible to reduce spike noises that are created during the steady-state operation of a d.c. brushless motor without relying on a complex circuit arrangement, while retaining the inherent motor driving characteristics.

It is possible to use transistors having a low withstand voltage for driving a brushless motor in half-wave drive mode without relying on a complex circuit arrangement.

What is claimed is:

1. A motor drive circuit comprising:
    an output amplifier which feeds a drive current for a winding in a motor, the output amplifier being coupled to the winding;
    a linear amplifier which detects a back electromotive force voltage induced on the winding of said motor, said linear amplifier delivering an analog signal thereof in accordance with the back electromotive force voltage to an input terminal of said output amplifier during a steady-state operation when said motor runs at a rated speed;
    a matrix circuit which delivers a digital signal to the input terminal of the output amplifier during a period after said motor has started until the motor speed reaches the rated speed, the digital signal being produced in synchronous with a clock signal for starting up the motor, and a switching circuit which is coupled between the linear amplifier, the matrix circuit and the input terminal of the output amplifier, and which delivers one of the analog signal outputted from the linear amplifier and the digital signal outputted from the matrix circuit selectively to the input terminal of said output amplifier in response to a switching signal.

2. A motor drive circuit according to claim 1 further comprising:

a low-pass filter, coupled to an output terminal of said linear amplifier, which implements a phase compensation for the back e.m.f. voltage detected by said linear amplifier, said low-pass filter delivering the phase-compensated back electromotive force voltage to the input terminal of said output amplifier during the steady-state operation when said motor runs at the stated speed.

3. A motor drive circuit according to claim 1 further comprising:

a current control circuit, coupled to said output amplifier, which controls an amount of the drive current fed from said output amplifier to the winding, wherein the amount of the drive current is reduced by said current control circuit during the steady-state operation when said motor runs at the stated speed.

4. A motor drive circuit according to claim 1, wherein said motor drive circuit is formed on one semiconductor substrate, and wherein said motor drive circuit further comprises:

an external output terminal which is coupled to an output terminal of said output amplifier and which is coupled to the winding of said motor.

5. A motor drive circuit according to claim 1 further comprising:

a clock oscillator which generates the clock signal when the motor is started up.

6. A motor drive circuit according to claim 5 further comprising:

a back electromotive force voltage detection circuit which detects a timing of a zero cross point of the back electromotive force voltage, and which outputs a timing signal corresponding to the detected timing during a period after the detection circuit has detected the timing of the zero cross point until the motor speed reaches the rate speed, wherein the digital signal is produced on the basis on the timing signal.

7. A motor drive circuit according to claim 1 wherein the winding has a first end and a second end; and wherein the output amplifier further comprises:

output transistors each having a current path coupled between the first end of each corresponding winding and a ground voltage source, wherein each of the output transistors is brought into a saturated conductive state or a cutoff state in accordance with a phase conduction sequence; and a first transistor having a first current path coupled between a power voltage source and a neutral point defining a common connection point of the second end of each winding, and having a gate terminal, wherein the first transistor operates as a current source.

8. A motor drive circuit according to claim 7, wherein the output amplifier further comprises:

a second transistor having a second current path coupled between the power voltage source and the gate terminal of the first transistor, and controlling a current flowing in the first current path of the first transistor.

* * * * *

UNITED STATES PATENT AND TRADEMARK OFFICE
CERTIFICATE OF CORRECTION

PATENT NO. : 5,818,179
DATED : October 6, 1998
INVENTOR(S) : Y. KOKAMI et al

Page 1 of 2

Figure 5A:
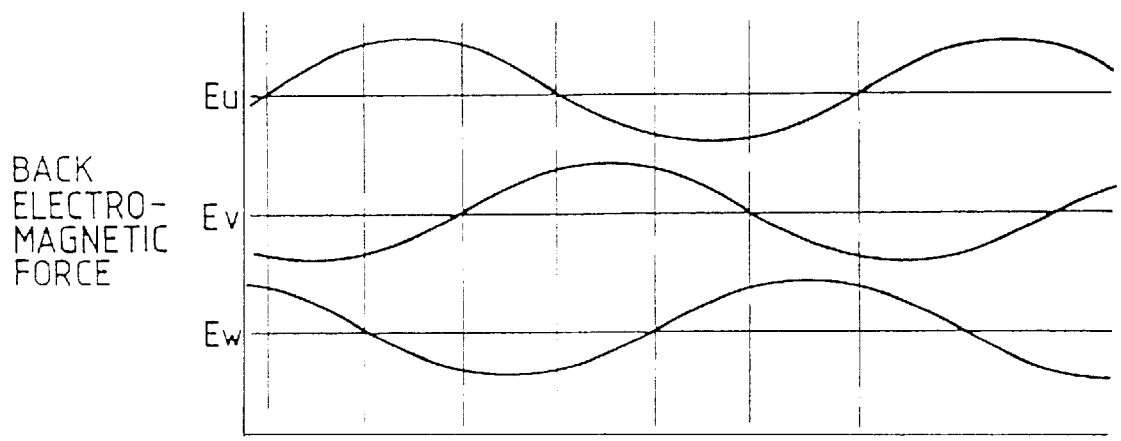
FIG. 5 is a timing chart showing the operational waveforms of the drive circuit during the back e.m.f. detective drive operation.
Figure 5B:
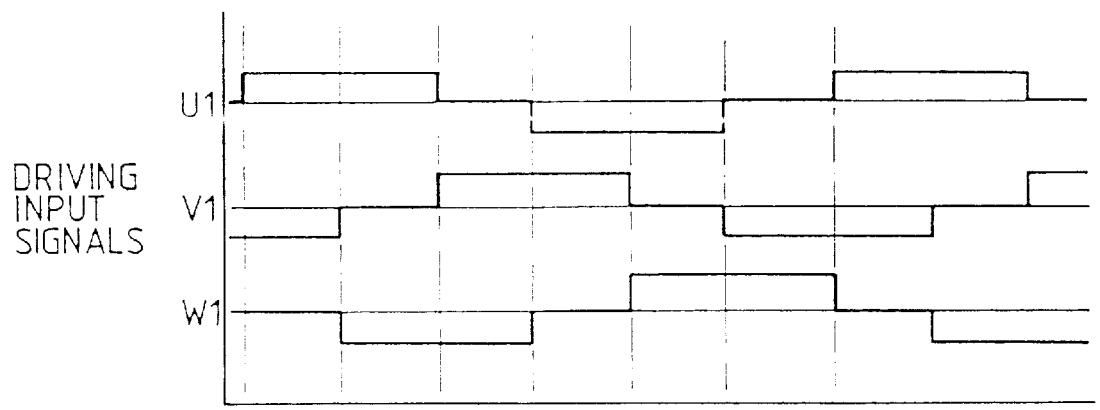
Figure 6A:
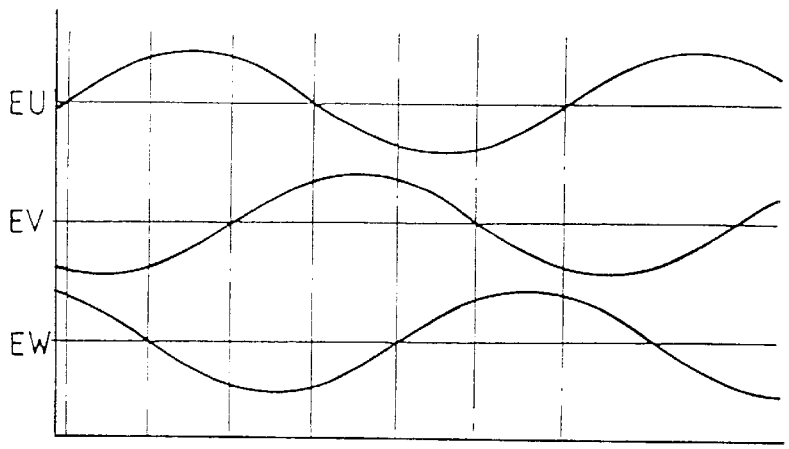
FIG. 6 is a timing chart showing the operational waveforms of the drive circuit during the soft-switching drive operation.
Figure 6B:
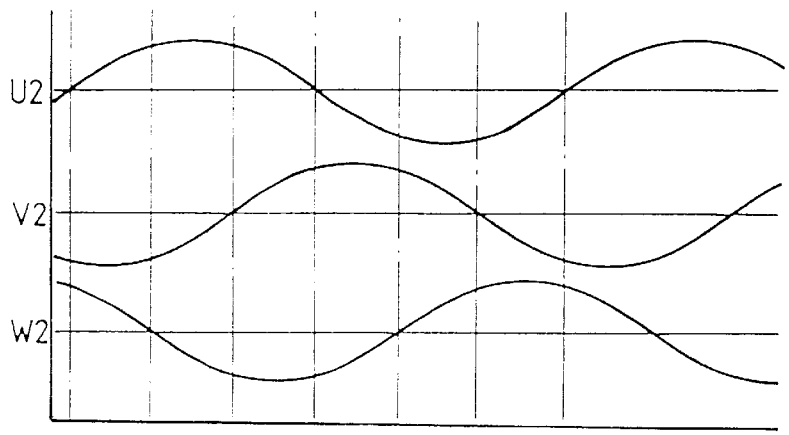
Figure 6C:
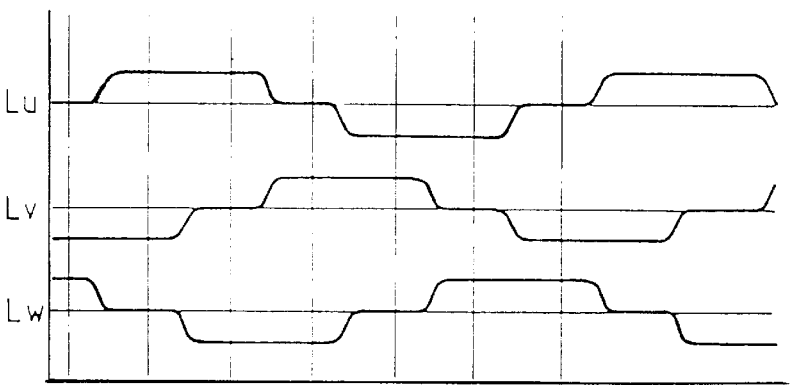
Figure 7A:
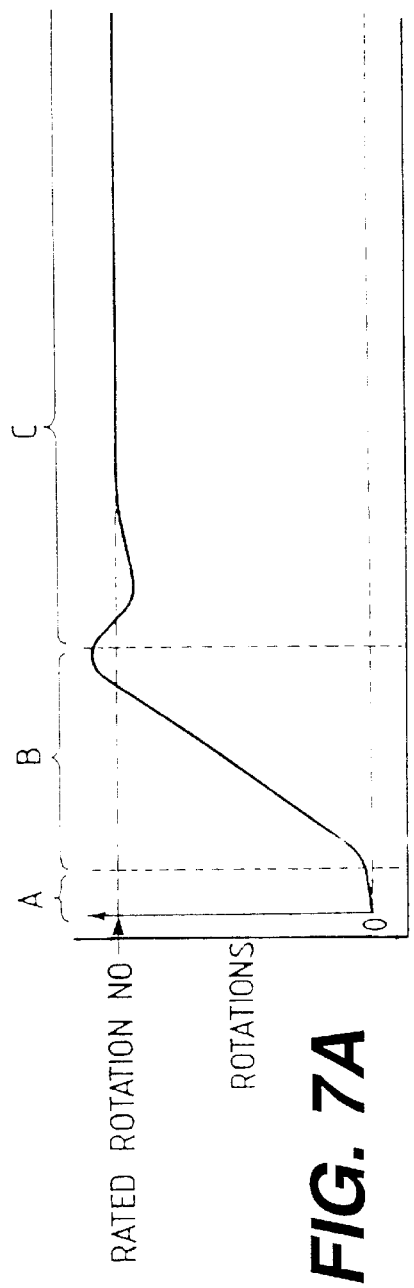
FIG. 7 is a graph showing the motor operating modes along the speed range.
Figure 7B:
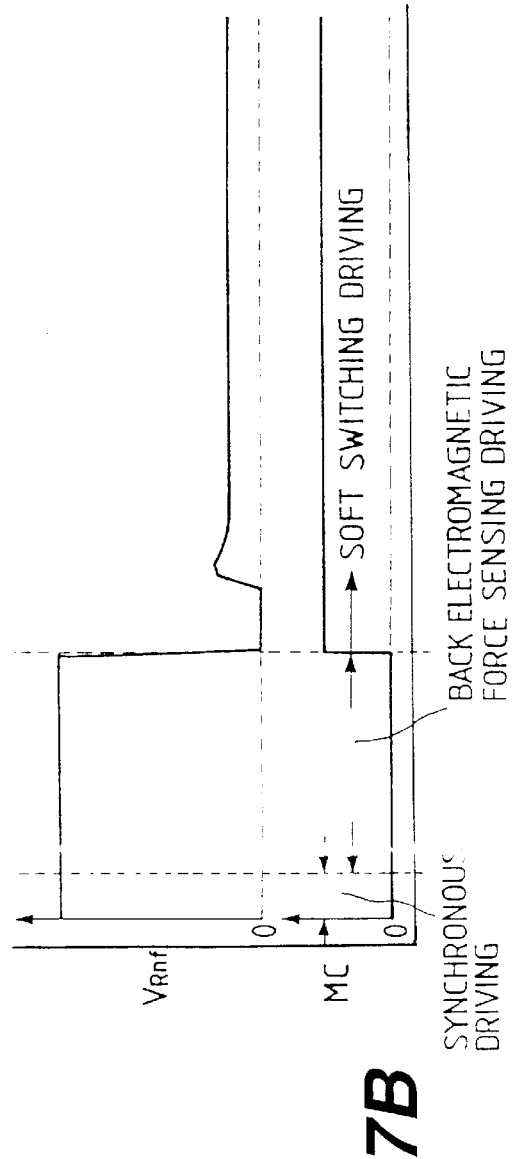

It is certified that error appears in the above-identified patent and that said Letters Patent is hereby corrected as shown below:

Column 3, line 37, change "Fig. 4 is a timing chart" to --Figs. 4A and 4B are timing charts--;

line 40, change "Fig. 5 is a timing chart" to --Figs. 5A and 5B are timing charts--;

line 43, change "Fig. 6 is a timing chart" to --Figs. 6A, 6B and 6C are timing charts--; and line 46, change "Fig. 7 is a graph" to --Figs. 7A and 7B are graphs--.

Figure 15A:
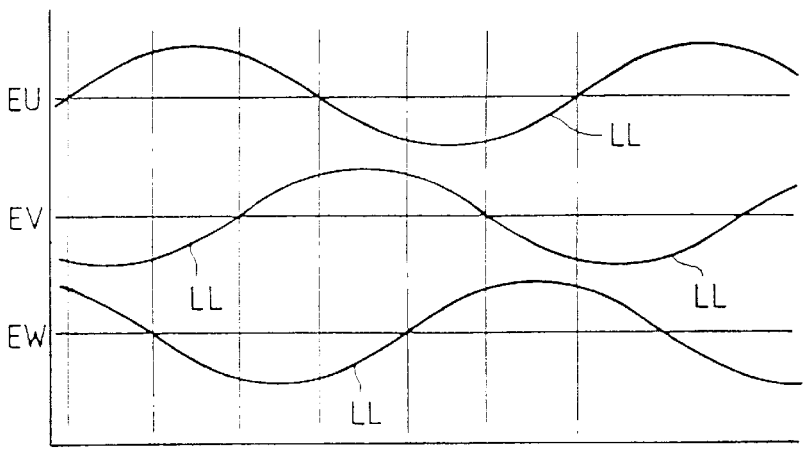
FIG. 15 is a timing chart showing the voltage and current waveforms when the motor is run in half-wave drive mode of the soft-switching drive operation.
Figure 15B:
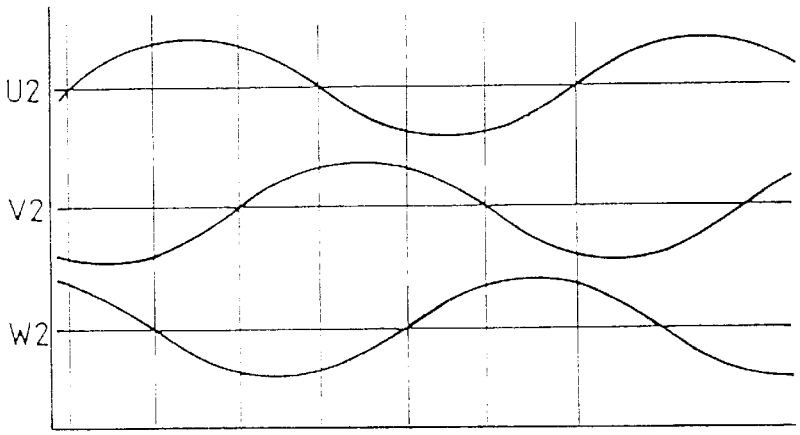
Figure 15C:
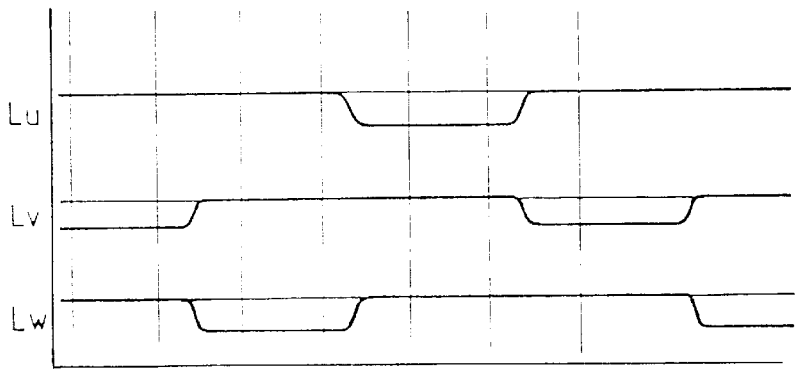

Column 4, line 1, change "Fig. 15 is a timing chart" to --Figs. 15A, 15B and 15C are timing charts--.

Column 8, line 62, change "Fig. 4 shows" to --Figs. 4A and 4B show--.

Column 9, line 4, change "Fig. 5 shows" to --Figs. 5A and 5B show--;

line 13, change "Fig. 6 shows" to --Figs. 6A, 6B and 6C show--;

line 61, change "Fig. 6" to --Figs. 6A, 6B and 6C--.

Column 10, line 11, change "Fig. 7 shows" to --Figs. 7A and 7B show--.

UNITED STATES PATENT AND TRADEMARK OFFICE
CERTIFICATE OF CORRECTION

PATENT NO. : 5,818,179
DATED : October 6, 1998
INVENTOR(S) : Y. KOKAMI, et al

It is certified that error appears in the above-identified patent and that said Letters Patent is hereby corrected as shown below:

Column 14, line 19, change "Fig. 15 shows" to --Figs. 15A, 15B and 15C show--.

Signed and Sealed this

Twenty-sixth Day of January, 1999

Attest:

Attesting Officer

*Acting Commissioner of Patents and Trademarks*